(12) United States Patent
Park

(10) Patent No.: US 8,253,596 B2
(45) Date of Patent: Aug. 28, 2012

(54) DIGRAPHIC KEYPAD

(76) Inventor: Chan Young Park, San Francisco, CA (US)

( * ) Notice: Subject to any disclaimer, the term of this patent is extended or adjusted under 35 U.S.C. 154(b) by 1190 days.

(21) Appl. No.: 12/055,479

(22) Filed: Mar. 26, 2008

(65) Prior Publication Data

US 2009/0066542 A1    Mar. 12, 2009

(30) Foreign Application Priority Data

Sep. 11, 2007 (KR) .................. 10-2007-0092052

(51) Int. Cl.
*H03K 17/94* (2006.01)
*H03M 11/02* (2006.01)

(52) U.S. Cl. .............. 341/22; 341/23; 341/28; 400/100; 400/110

(58) Field of Classification Search ............ 341/22, 341/23, 28; 400/100, 110
See application file for complete search history.

(56) References Cited

U.S. PATENT DOCUMENTS

| | | | | |
|---|---|---|---|---|
| 3,967,273 A | * | 6/1976 | Knowlton | 341/22 |
| 4,211,497 A | * | 7/1980 | Montgomery | 400/486 |
| 4,244,659 A | * | 1/1981 | Malt | 400/486 |
| 4,332,493 A | * | 6/1982 | Einbinder | 400/484 |
| 4,531,119 A | * | 7/1985 | Nakayama et al. | 345/171 |
| 4,615,629 A | * | 10/1986 | Power | 400/486 |
| 4,655,621 A | * | 4/1987 | Holden | 400/100 |
| 4,669,903 A | * | 6/1987 | Herzog et al. | 400/489 |
| 5,059,048 A | * | 10/1991 | Sirkin | 400/486 |
| 5,339,358 A | * | 8/1994 | Danish et al. | 379/368 |
| 5,818,437 A | * | 10/1998 | Grover et al. | 715/811 |
| 5,861,821 A | * | 1/1999 | Kato et al. | 341/22 |
| 6,231,252 B1 | * | 5/2001 | Kitamura | 400/484 |
| 6,847,706 B2 | * | 1/2005 | Bozorgui-Nesbat | 379/93.27 |
| 7,202,802 B2 | * | 4/2007 | Salman et al. | 341/22 |
| 7,561,685 B2 | * | 7/2009 | Griffin | 379/433.07 |
| 7,736,078 B2 | * | 6/2010 | Webber | 400/489 |
| 2005/0104869 A1 | | 5/2005 | Chung | |
| 2007/0147933 A1 | | 6/2007 | Zhang | |

OTHER PUBLICATIONS

Shumin Zhai et al., "Performance Optimization of Virtual Keyboards," IBM Almaden Research Center, Human-Computer Interaction, 2002, vol. 17, pp. 89-129.
International Search Report for PCT/KR2008/005330.
Written Opinion for PCT/KR2008/005330.

* cited by examiner

*Primary Examiner* — Rexford Barnie
*Assistant Examiner* — Zeev V Kitov
(74) *Attorney, Agent, or Firm* — Thomas H. Ham; Wilson Ham & Holman

(57) ABSTRACT

A digraphic keypad includes a configuration of specific keys. These specific keys include an "S" key, an "O" key, a "U" key, an "A" key, an "N" key, an "I" key, a "T" key, an "E" key, an "R" key, an "H" key, a "D" key and an "L" key.

26 Claims, 2 Drawing Sheets

DIGRAPHIC KEYPAD

CROSS REFERENCE TO RELATED APPLICATION

This application is entitled to the benefit of Korean Patent Application No. 10-2007-0092052 filed in the Korean Intellectual Property Office on Sep. 11, 2007, which is incorporated herein by reference.

BACKGROUND OF THE INVENTION

Keypads are widely used in various electronic devices, such as personal digital assistants (PDAs), multi-purpose cellular phones (3G phones) and Smartphones, to enter alphanumeric inputs and/or commands. In a typical keypad, the keys are usually arranged in a QWERTY configuration or a 12-key configuration, which is commonly found in cellular phones.

A concern with the QWERTY configuration is that the locations of the keys are not efficiently arranged. Thus, a user has to learn where the key are located in the QWERTY configuration in order to enter different words. Furthermore, since there are twenty-six different keys for the different letters, learning where the different letter keys are located can be challenging.

Similarly, a concern with the conventional 12-key configuration is that the keys are not arranged in an efficient manner for entering words. Although the keys for the different letters in the conventional 12-key configuration can be readily found, entering words using these letter keys can be difficult since three or four letters are entered using the same key. Furthermore, there is no correlation between the locations of the letter keys in the conventional 12-key configuration and words that are typically entered. Thus, entering words using such a keypad can be difficult.

Therefore, there is a need for a keypad that addresses the above-described concerns.

SUMMARY OF THE INVENTION

A digraphic keypad includes a configuration of specific keys. These specific keys include an "S" key, an "O" key, a "U" key, an "A" key, an "N" key, an "I" key, a "T" key, an "E" key, an "R" key, an "H" key, a "D" key and an "L" key. The configuration of these specific keys of the digraphic keypad is derived as a result of an integration of letter frequency, digraphic tendency and an intuitive character arrangement so that the keypad is easy to learn and use.

A digraphic keypad in accordance with an embodiment of the invention comprises a first row of keys including an "S" key, an "O" key and a "U" key, a second row of keys including an "A" key, an "N" key and an "I" key, a third row of keys including a "T" key, an "E" key and an "R" key, and a fourth row of keys including an "H" key, a "D" key and an "L" key.

A digraphic keypad in accordance with another embodiment of the invention comprises a first column of keys including an "S" key, an "A" key, a "T" key and an "H" key, a second column of keys including an "O" key, an "N" key, an "E" key and a "D" key, and a third column of keys including a "U" key, an "I" key, an "R" key and an "L" key.

A digraphic keypad in accordance with another embodiment of the invention comprises a core matrix of keys arranged in a configuration of four rows and three columns. The keys in the core matrix consist of an "S" key, an "O" key, a "U" key, an "A" key, an "N" key, an "I" key, a "T" key, an "E" key, an "R" key, an "H" key, a "D" key and an "L" key.

Other aspects and advantages of the present invention will become apparent from the following detailed description, taken in conjunction with the accompanying drawings, illustrated by way of example of the principles of the invention.

DETAILED DESCRIPTION

Figure 1:
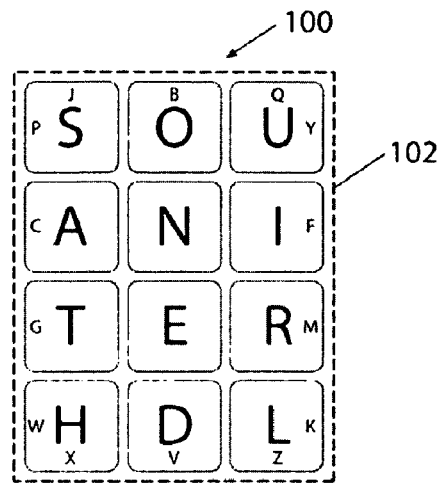
FIG. 1 is a diagram of a digraphic keypad with a core 3×4 key matrix in accordance with an embodiment of the invention.

The letter-number dial (Alphanumeric dial plate) was developed by William G. Blauvelt (AT&T) during the 1920's. This was the first customer dialing system to become widespread. Initially, it had only numbers, but letters were soon added to designate exchanges. By late 1930's, the arrangement was largely standardized: the letters "Q" and "X" were dropped but "X" remained for exchange. In 1964, telephones were introduced which offered buttons rather than rotary dialing; this, naturally, reflected the new tone dialing, in which automated switching systems translated tones into numbers. By the 1980's, rotary telephones were quite rare.

The first telephone numbers included abbreviations of the street name; long-distance calling required the operator as an intermediary. After 1961, letters were phased out from telephone numbers and long-distance dialing was automated; area codes were standardized and it became possible for direct dialing to any part of North America. As a result, the combination of letters at the beginning of each telephone number were replaced by the corresponding letters; over the years, as people moved and changed telephone numbers, even this was removed. Consumer goods which are universal, however, are of all things the most conservative. Decades after letters became entirely superfluous in telephone numbers, businesses and public service organizations continue to use letters as mnemonics for their telephone numbers (e.g., 1-800-FLOWERS).

Meanwhile, in the parallel universe of computing, the Internet was introduced by the Advanced Research Projects Agency (ARPA of the Pentagon in 1971; other, competing forms of network protocols were later melded with the Internet TCP/IP as demands for bandwidth increased. Text messaging evolved from bulletin board services (BBS) to the modem HTML-based email applications (National Center for Supercomputing Applications, c. 1989). As this happened, the mobile phone was rapidly evolving from a distinctly handicapped, inferior version of its landline cousin to a talented prodigy.

The most spectacular developments in the mobile phone industry were cellular technology (1980's), which allowed far more reliable connections; digitalized transmission (1995), which would lead to better fidelity, and paging. Pagers were introduced in 1980's, and actually introduced numerical messaging. The first pagers were intended to beep the user when she received a call, and then display a call-back number entered by the caller. Almost at once, callers began paging not just telephone numbers but number sequences with certain significance. For example, in gangland argot, the number, 187, was used as a death threat (as in Section 187 of the California Penal Code, addressing homicide).

Countries where reliable conventional communications were not as reliable, as usual, led the way in user innovation. In 1986, for example, lists of numerical codes for common Tagalog phrases were widely circulated and enabled resistance to the Marcos Regime to spill over into the People Poser Movement by which time secret police began to pay attention to those dog-eared lists of numeric codes.

In the mid-1990's, cellular phones had liquid crystal displays (LCD) and the PCS now offered paging services or their equivalent in cell phones. Pagers were perilously close to being cell phones; they had large LCD and could accept letters as well as numbers. The brief era of the pager, therefore, can really be said to have introduced text messaging.

The most interesting aspect of the globalized paging/cellular industry, dominated as it was by firms such as Finnish Nokia, was that companies operating in Finland and Italy could cross-pollinate user trends in those different societies so that Italian customers were exposed to Finnish techniques, and vice versa. As a result, the pressure on telecoms in the EU led to the move to 3G networks, where mobile phones almost completely match the capabilities of home computers. No doubt this is on the horizon, but for the next decade or so we are looking at a world where vast proportions of the human race (perhaps a third) will be unable to count on reliable telecom infrastructure anywhere in their society. For such people, many of whom use the Roman alphabet (e.g., the bush of South America, most of Africa, the Moluccas and Papua) efficient, cheap text messaging technology is an immediate hope for bridging the digital divide.

With text messaging, the dial of the telephone made a full circle: from letters (for selecting another telephone line) to numbers only (with the letters serving as a mere mnemonic) and back to letters (where phones can now be used exclusively for text messaging). But even with the introduction of the keypad in 1994, no one in the world of Roman characters sought to re-arrange those letters for convenience. In the world of other, very different writing systems, such as Hangul (Korean language characters), efforts are being made now to optimize the keypad.

Why is the Roman keypad regarded as immutable? It has survived longer than the keypad itself. With the introduction of the PDA, with the handwriting recognition, we actually see icons which allow a user to key-in numbers using a stylus on a virtual keypad that is unchanged since 1937! Unlike keyboards used at work, cell phone users enjoy little benefit using a previous design; they are unlikely to use a phone for text messaging issued by their employer. The introduction of PDAs has spawned a huge variety of interfaces which allowed natural selection to do its work. The absence of a universal interface for PDAs has been offset by the fact that the applications for them are changing so rapidly; the same is true for cell phones. Users are willing to accept and learn new interfaces if the appliance they are using is changing application rapidly.

Currently, data entry on small electronic devices takes three possible formats:
1. 12-keypads, based on a 3-wide by 4-high array of numeric symbols and accompanied by letters; multiple strokes, or taps, are required to achieve letters;
2. Replicas of the familiar QWERTY arrangement of letters on full-sized computer keyboards;
3. Stylus entry with a combination of menus and handwriting recognition software.

Combinations of the first two have also been introduced, such as arrangements that superimpose the 12-keypad found on touch-tone telephones upon the QWERTY arrangement, or superimposing a simple alphabetical arrangement of characters on a cellular telephone keypad. The QWERTY-based version allows the user to switch between the two arrays; the 12-keypad-based arrangement uses the principle of overlapping keys.

However, there remains a failure to take measure of ergonomics in design. The familiarity and base of skill that users develop from using the QWERTY keyboard, for example, is of little use when using a keypad with thumbs. Likewise, the 12-key number pad on cellular phones has the letters superimposed, and users can enter letters by repeatedly pressing keys. However, the 12-key design appears to be a slave to the legacy technology of touchtone telephone receivers; the sequence of letters used on telephones was for randomly-chosen telephone numbers, not spelling out words as they appear in language. Hence, no preference is given to the more commonly used letters, like "S" or "E". In the late 1990's, a group of inventions incorporated overlapping keys, in which a keypad user would push a cluster of buttons and thereby select the one in the center of the cluster; this has been successfully implemented in cell phones. However, this technical advantage did not lead to an ergonomic improvement; the keypads that use this feature merely inserted the letters between the numbers in an alphabetical order.

Ordinary cell phone keypads (3×4 array) require one to push a key four times to get "S" and once to get "P". Why is this, when "S" is far more commonly used than "P"? It is simply because the order of letters in the alphabet, fixed since biblical times, says that "S" has to come after "P", "Q" and "R". No other reason exists for this arrangement. Conventional cell phone keypads ignore four keys (out of twelve) because the format was developed fifty years ago when no one expected tiny versions of the keyboard would ever be used as a typewriter keypad substitute or geared for digital text in cyber world. There was absolutely no need for letters to have any particular arrangement on the cell phone keypad. Traditional keypads have remained unchanged for decades, with letters in an arbitrary layout. Original alphanumeric keypad layout only intended to recall phone made-name easy in a rotary phone era, not intended for a digital text input in cyber world.

With reference to FIGS. 1-6, digraphic keypads 100, 200, 300, 400, 500 and 600 in accordance with embodiments of the invention are described. The digraphic keypads 100, 200, 300, 400, 500 and 600 include an improved layout of keys, which could be used as an input mechanism for any device to enter symbols and commands. As an example, the digraphic keypads 100, 200, 300, 400, 500 and 600 can be used on small electronic devices, such as personal digital assistants (PDAs), tablet personal computers (PCs), pocket PCs, television remotes, watches multi-purpose cellular phones (3G phones) and Smartphones. The configurations of the digraphic keypads 100, 200, 300, 400, 500 and 600 are derived as a result of an integration of letter frequency, digraphic tendency and an intuitive character arrangement so that the keypads are easy to learn and use.

As shown in FIG. 1, the digraphic keypad 100 includes a core 3×4 matrix 102 of keys. The core 3×4 key matrix 102 includes three columns and four rows, which is a common configuration for cellular phone dial pad. The first row (from the top) of the core 3×4 key matrix 102 includes an "S" key, an "O" key and a "U" key in order from left to right. The second row of the core 3×4 key matrix 102 includes an "A" key, an "N" key and an "I" key in order from left to right. The third row of the core 3×4 key matrix 102 includes a "T" key, an "E" key and an "R" key in order from left to right. The fourth row of the core 3×4 key matrix 102 includes an "H" key, a "D" key and an "L" key in order from left to right.

Thus, the first column (from the left) of the core 3×4 key matrix 102 includes the "S" key, the "A" key, the "T" key and the "H" key in order from top to bottom. The second column of the core 3×4 key matrix 102 includes the "O" key, the "N" key, the "E" key and the "D" key in order from top to bottom. The third column of the core 3×4 key matrix 102 includes the "U" key, the "I" key, the "R" key and the "L" key in order from top to bottom.

As illustrated in FIG. 1, for the digraphic keypad 100, the "S", "O", "U", "A", "I", "T", "R", "H", "D" and "L" keys are multiple character input keys. As used herein, a multiple character input key is a key that can be used to enter multiple characters. In this embodiment, the "S" key can be used to also enter "J" and "P". Similarly, the "U" key can be used to also enter "Q" and "Y", the "H" key can be used to also enter "W" and "X", and the "L" key can be used to also enter "K" and "Z". The "O", "A", "I", "T", "R" and "D" keys can be used to also enter "B", "C", "F", "G", "M" and "V", respectively.

The following table shows the keys and the type of taps needed to enter different letters using the digraphic keypad 100, as well as key values for the letters.

| Letter | Single Tap | Double Tap | Triple Tap | Key value |
|---|---|---|---|---|
| A | "A" Key | | | 1 |
| B | | "O" Key, "O" Key | | 2 |
| C | | "A" Key, "A" Key | | 3 |
| D | "D" Key | | | 4 |
| E | "E" Key | | | 5 |
| F | | "I" Key, "I" Key | | 6 |
| G | | "T" Key, "T" Key | | 7 |
| H | "H" Key | | | 8 |
| I | "I" Key | | | 9 |
| J | | | "S" Key, "S" Key, "S" Key | 10 |
| K | | "L" Key, "L" Key | | 11 |
| L | "L" Key | | | 12 |
| M | | "R" Key, "R" Key | | 13 |
| N | "N" Key | | | 14 |
| O | "O" Key | | | 15 |
| P | | "S" Key, "S" Key | | 16 |
| Q | | | "U" Key, "U" Key, "U" Key | 17 |
| R | "R" Key | | | 18 |
| S | "S" Key | | | 19 |
| T | "T" Key | | | 20 |
| U | "U" Key | | | 21 |
| V | | "D" Key, "D" Key, | | 22 |
| W | | "H" Key, "H" Key | | 23 |
| X | | | "H" Key, "H" Key, "H" Key | 24 |
| Y | | "U" Key, "U" Key | | 25 |
| Z | | | "L" Key, "L" Key, "L" Key | 26 |

In the digraphic keypad 100, the most frequent single letter "E" among the twenty-six letters of the English alphabet is positioned near the center of the core 3×4 key matrix 102, and thus near the focal point of the core 3×4 key matrix 102. The other four vowels, "O", "U", "A" and "I" are positioned near the letter "E". Specifically, the "O" key is positioned on the center column, above the "E" key. The "U" key is positioned next to the "O" key on the right. The "A" and "I" keys are diagonally positioned next to the "E" key. The seven most-frequent consonants, "D", "H", "L", "N", "R", "S" and "T", are arranged around the vowels in relation to letter frequency and digraphic tendency. The eight less-frequent consonants, "P", "C", "G", "W", "Y", "F", "M" and "K", are superimposed (subscripted) to the eight letters, "S", "A", "T", "H", "U", "I", "R" and "L", respectively, in relation to digraph tendency. In an embodiment, these eight less-frequent consonants are entered with a double tap on the "S", "A", "T", "H", "U", "I", "R" and "L" keys and with a double taps on the "O" and "D" keys. The six least-frequent consonants, "B", "J", "Q", "X", "V" and "Z" are superimposed (subscripted) to four consonants and two vowels, "O", "S", "U", "H", "D" and "L", respectively. In an embodiment, these six least-frequent consonants are entered with triple taps on the "H", "U", "S" and "L" keys and with double taps on the "O" and "D" keys. All the vowels and consonants are arranged in line with letter-frequency of use and digraph tendency and operated by a minimum movement radius of the operator. Thus, the digraphic keypad 100 has a unique cluster arrangement of keys that is both schematic and ergonomic to improved learning ability and ease of use.

The principle of the learning curve for a keypad requires an optimized letter-frequency along with digraph layout that facilitates text entry. The digraphic keypad 100 is configured such that the most commonly used 12 characters including all 5 vowels are in line with a digraph tendency that accounts for 77% frequency in any input-text. This schematic layout makes the key area more interrelated and compact. This has a number of advantages:
  1. An overall reduction in the finger/stylus distance.
  2. Friendly interface of keystrokes
  3. Optimum use of digraphs, trigraphs, and strings of letters (characters), etc.
  4. Since users are already familiar with the configuration of 12-key keypad, the layout of the digraphic keypad 100 improves usability/flexibility, which means that the layout of the keys can be learned very quickly, i.e., fast learning curve.
  5. Character arrangement in a cluster according to letter frequency of use creates a user-friendly interface.

Figure 2:
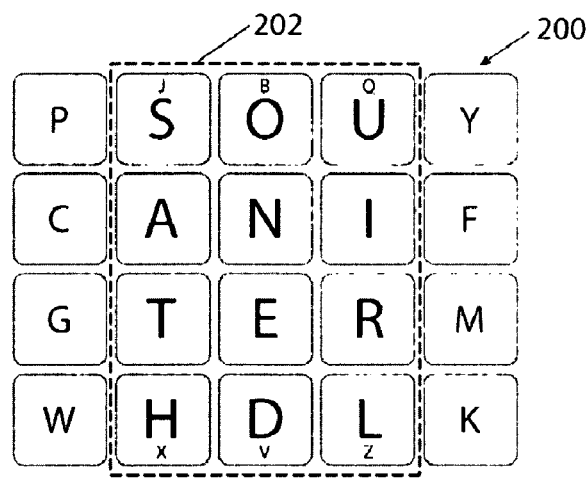
FIG. 2 is a diagram of a digraphic keypad with a core 3×4 key matrix and additional eight keys in accordance with another embodiment of the invention.

Turning now to FIG. 2, the digraphic keypad 200 includes a core 3×4 matrix 202 of keys. The core 3×4 key matrix 202 of the digraphic keypad 200 is similar to the core 3×4 key matrix 102 of the digraphic keypad 100. However, in the digraphic keypad 200, the keys of the core 3×4 key matrix 202 are not used to enter the letters "P", "C", "G", "W", "Y", "F", "M" and "K". Rather, the digraphic keypad 200 includes additional eight keys to accommodate these letters. Thus, the digraphic keypad 200 includes "P", "C", "G", "W", "Y", "F", "M" and "K" keys, which are single character input keys. That is, each of these keys is used to enter a single character. In an embodiment, the "P", "C", "G" and "W" keys are located in a column next to the first column of the core 3×4 key matrix 202 in order from top to bottom, and the "Y", "F", "M" and "K" keys are located in a column next to the third column of the core 3×4 key matrix 202 in order from top to bottom. However, in other embodiments, the "P", "C", "G", "W", "Y", "F", "M" and "K" keys may be arranged near the core 3×4 key matrix 202 in other configurations.

The following table shows the keys and the type of taps needed to enter different letters using the digraphic keypad 200, as well as key values for the letters.

| Letter | Type of Tap | | Key value |
|---|---|---|---|
| | Single Tap | Triple Tap | |
| A | "A" Key | | 1 |
| B | | "O" Key, "O" Key, "O" Key | 2 |
| C | "C" Key | | 3 |
| D | "D" Key | | 4 |
| E | "E" Key | | 5 |
| F | "F" Key | | 6 |
| G | "G" Key | | 7 |
| H | "H" Key | | 8 |
| I | "I" Key | | 9 |
| J | | "S" Key, "S" Key, "S" Key | 10 |
| K | "K" Key | | 11 |
| L | "L" Key | | 12 |
| M | "M" Key | | 13 |
| N | "N" Key | | 14 |
| O | "O" Key | | 15 |
| P | "P" Key | | 16 |
| Q | | "U" Key, "U" Key, "U" Key | 17 |
| R | "R" Key | | 18 |
| S | "S" Key | | 19 |
| T | "T" Key | | 20 |
| U | "U" Key | | 21 |
| V | | "D" Key, "D" Key, "D" Key | 22 |
| W | "W" Key | | 23 |
| X | | "H" Key, "H" Key, "H" Key | 24 |
| Y | "Y" Key | | 25 |
| Z | | "L" Key, "L" Key, "L" Key | 26 |

Figure 3:
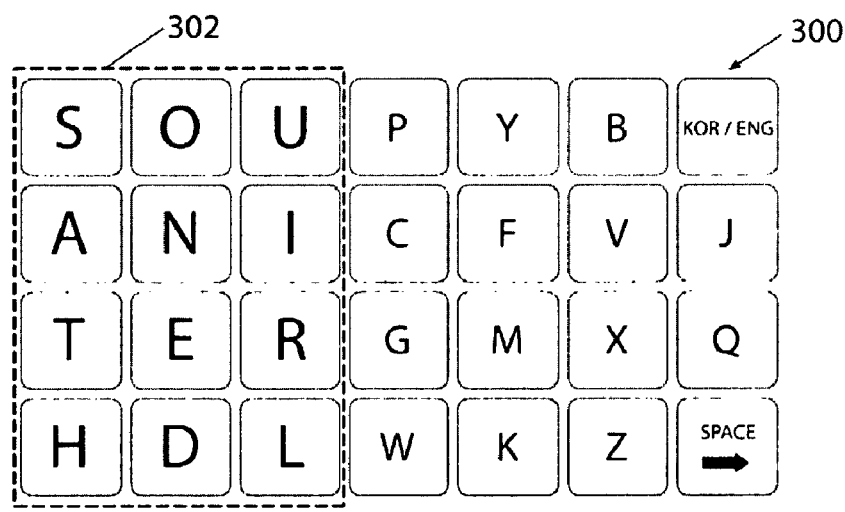
FIG. 3 is a diagram of a digraphic keypad with a core 3×4 key matrix and additional sixteen keys in accordance with another embodiment of the invention.

Turning now to FIG. 3, the digraphic keypad 300 includes a core 3×4 matrix 302 of keys. The core 3×4 key matrix 202 of the digraphic keypad 200 is similar to the core 3×4 key matrix 202 of the digraphic keypad 200. However, in the digraphic keypad 300, the keys of the core 3×4 key matrix 302 are also not used to enter the letters "J", "B", "Q", "X", "V" and "Z". Rather, the digraphic keypad 300 includes additional six single character input keys to accommodate these letters, in addition to the "P", "C", "G", "W", "Y", "F", "M" and "K" keys. In an embodiment, the "P", "C", "G" and "W" keys are located in a new first column next to the third column of the core 3×4 key matrix 302 in order from top to bottom, the "Y", "F", "M" and "K" keys are located in a new second column next to the new first column in order from top to bottom, and the "B", "V", "X" and "Z" keys are located in a new third column next to the new second column in order from top to bottom. The "J" and "Q" keys are located in a new fourth column next to the new third column, along with a "KOR/ENG" (Korean/English language conversion) key and a "space" key in the following order from top to bottom: "KOR/ENG", "J", "Q" and "space".

Figure 4:
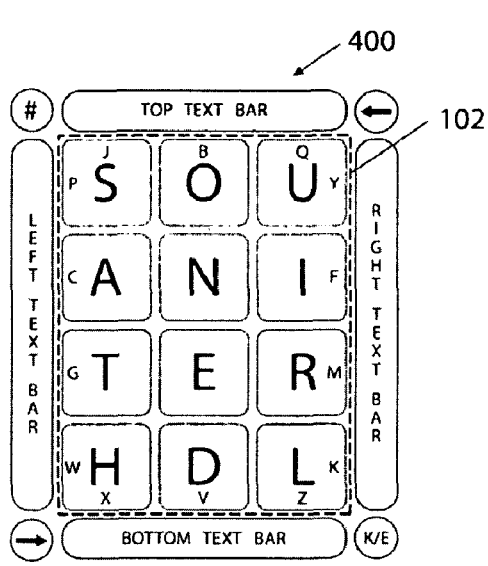
FIG. 4 is a diagram of a digraphic keypad with a core 3×4 key matrix, four text bars and additional four keys in accordance with another embodiment of the invention.

Turning now to FIG. 4, the digraphic keypad 400 is shown. The diagraph keypad 400 includes the same core 3×4 key matrix 102 found in the digraphic keypad 100. However, the digraphic keypad 400 also includes four text bars: a top text bar, a left text bar, a right text bar and a bottom text bar. These text bars are used to select different letters for a single key. Thus, in this embodiment, a single tap is used on each of the keys of the core 3×4 key matrix 102 to enter a single character. As illustrated in FIG. 4, the top text bar can be located above the first row of the core 3×4 key matrix 102, and the bottom text bar can be located below the fourth row of the core 3×4 key matrix 102. In addition, the left text bar can be located next to the first column of the core 3×4 key matrix 102, and the right text bar can be located next to the third column of the core 3×4 key matrix 102. In some embodiments, the left and right text bars may be placed at opposite sides of a device, such as a computer mouse keypad. The digraphic keypad 400 may also include a "#" key, a "←" (backspace) key, a "→" (space) key, and a "K/E" (Korean/English language conversion) key, each of which may be located at a corner of the keypad, as shown in FIG. 4.

Figure 5:
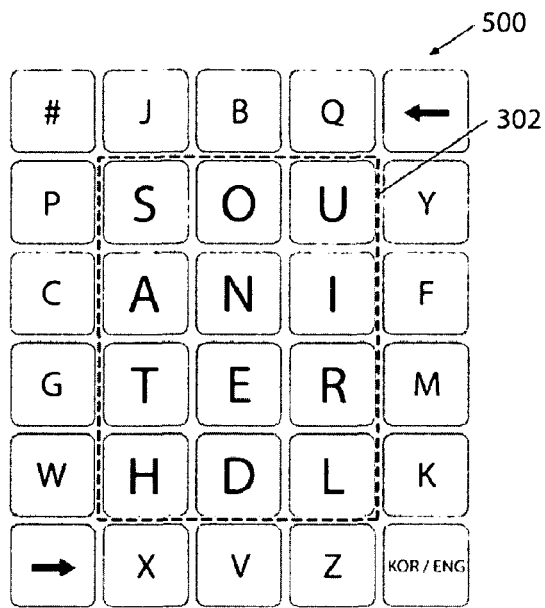
FIG. 5 is a diagram of a digraphic keypad with a core 3×4 key matrix and additional eighteen keys in accordance with another embodiment of the invention.

Turning now to FIG. 5, the digraphic keypad 500 includes the same core 3×4 key matrix 302 of the digraphic keypad 300. The digraphic keypad 500 further includes additional eighteen keys. Specifically, the digraphic keypad 500 includes fourteen letter keys, "P", "C", "G", "W", "Y", "F", "M", "K", "J", "B", "Q", "X", "V" and "Z" keys, and additional four non-letter keys, "#", "←", "→" and "KOR/ENG" keys. The "P", "C", "G" and "W" keys are located in a new first column next to the first column of the core 3×4 key matrix 302 such that the "P", "C", "G" and "W" keys are positioned in the same rows as the "S", "A", "T" and "H" keys, respectively, of the core 3×4 key matrix 302. The "Y", "F", "M" and "K" keys are located in a new second column next to the third column of the core 3×4 key matrix 302 such that the "Y", "F", "M" and "K" keys are positioned in the same rows as the "U", "I", "R" and "L" keys, respectively, of the core 3×4 key matrix 302. The "J", "B" and "Q" keys are located in a new first row above the first row of the core 3×4 key matrix 302 such that the "J", "B" and "Q" keys are positioned in the same columns as the "S", "O" and "U" keys, respectively, of the core 3×4 key matrix 302. The "X", "V" and "Z" keys are located in a new second row below the fourth row of the core 3×4 key matrix 302 such that the "X", "V" and "Z" keys are positioned in the same columns as the "H", "D" and "L" keys, respectively, of the core 3×4 key matrix 302. The "#", "←", "→" and "KOR/ENG" keys are positioned at the corners of the digraphic keypad 500 such that the "#" and "→" key are located in the new first column and the "←" and "K/Eng" keys are located in the new second column.

Figure 6:
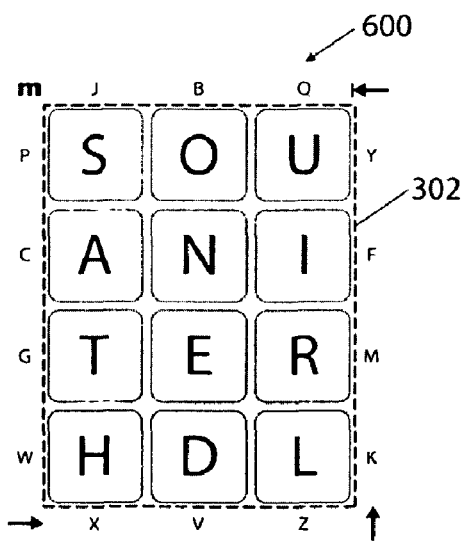
FIG. 6 is a diagram of a digraphic keypad with a core 3×4 key matrix and additional eighteen keys in accordance with another embodiment of the invention.

Turning now to FIG. 6, the digraphic keypad 600 is similar to the digraph keypad 500. As shown in FIG. 6, the digraphic keypad 600 also includes the same core 3×4 key matrix 302 of the digraphic keypad 300. The digraphic keypad 600 further includes additional eighteen keys. Specifically, the digraphic keypad 600 includes fourteen letter keys, "P", "C", "G", "W", "Y", "F", "M", "K", "J", "B", "Q", "X", "V" and "Z" keys, and additional four non-letter keys, "m" (language conversion), "←", "→", "↑" (shift) keys. The "P", "C", "G", "W", "Y", "F", "M", "K", "J", "B", "Q", "X", "V" and "Z" keys of the digraphic keypad 600 are located in the same positions as the "P", "C", "G", "W", "Y", "F", "M", "K", "J", "B", "Q", "X", "V" and "Z" keys of the digraphic keypad 500. The "m", "←", "→" and "↑" keys are positioned at the corners of the digraphic keypad 600 such that the "m" and "→" key are located in the same column as the "P", "C", "G" and "W" keys, and the "←" and "↑" keys are located in the same column as the "Y", "F", "M" and "K" keys. In this embodiment, the borders of the additional keys are not shown. However, these additional keys function in the same manner as other keys. The digraphic keypad 600, as well as other digraphic keypad in accordance with embodiments of the invention, may be implemented as graphics on a touch-screen display.

The following table illustrates examples of English words with common digraphs, which shows that keys for digraphic letters should be arranged in close proximity to each other.

| | |
|---|---|
| RM | aRM, stoRM, noRM, waRM, chaiRMan, foRM, haRMony, speRM |
| LK | waLK, taLK, miLK, siLK, eLK, baLK, buLK, cauLK, wiLKinson |
| RK | woRK, daRK, poRK, paRK, maRK, coRK, baRK, stoRK, shaRK |
| RD | haRD, woRD, thiRD, caRD, swoRD, oRDinary, orchaRD |
| LD | hoLD, worLD, oLD, chiLD, soLD, goLD, fieLD, heLD, boLD |
| AN | ANy, mANy, compANy, sANg, ANd, ANswer, ANnounce, ANdy |
| ER | watER, hER, ERrand, monstER, sistER, millER, foundER, emERgency |
| OU | bOUlder, sOUl, seOUl, bOUght, fOUnder, cOUnt, sOUnd, shOUlder |
| SP | SPeak, SPider, SPend, SPring, SPoon, SPin, SPill, SPray, inSPect |
| CT | aCT, contaCT, perfeCT, distriCT, exaCT, compaCT, inspeCT |
| WH | WHat, WHere, WHen, WHirl, WHip, WHole, WHo, WHich, WHich |
| RN | tuRN, buRN, baRN, coRN, uRN, moRNing, eaRN, daRN |

The following table shows digraph frequency and a comparison of finger distances using a conventional QWERTY keypad and the digraphic keypad 200 with similar sized keys based on a sample of 40,000 words.

| Digraph | Count | Frequency | QWERTY | Digraphic Keypad | QWERTY/ Digraphic Keypad +%/−% |
|---|---|---|---|---|---|
| th | 5532 | 1.52 | 1.41 | 1 | 141% |
| he | 4657 | 1.28 | 3.16 | 1.41 | 224% |
| in | 3429 | 0.94 | 2.24 | 1 | 224% |
| er | 3420 | 0.94 | 1 | 1 | 100% |
| an | 3005 | 0.82 | 6.08 | 1 | 608% |
| re | 2465 | 0.68 | 1 | 1 | 100% |
| nd | 2281 | 0.63 | 4.12 | 2 | 206% |
| at | 2155 | 0.50 | 4.12 | 1 | 412% |
| on | 2086 | 0.57 | 2.83 | 1 | 283% |
| nt | 2058 | 0.56 | 2.83 | 1.41 | 200% |
| ha | 2040 | 0.56 | 5 | 2 | 250% |
| es | 2033 | 0.56 | 1.41 | 2.24 | −36% |
| st | 2009 | 0.55 | 3.16 | 2 | 158% |
| en | 2005 | 0.55 | 4.47 | 1 | 447% |
| ed | 1942 | 0.53 | 1 | 1 | 100% |
| to | 1904 | 0.52 | 4 | 2.24 | 79% |
| it | 1822 | 0.50 | 3 | 2.24 | 134% |
| ou | 1820 | 0.50 | 2 | 1 | 100% |
| ea | 1720 | 0.47 | 2.24 | 1.41 | 159% |
| hi | 1690 | 0.46 | 2.24 | 2.83 | −21% |
| is | 1660 | 0.46 | 6.08 | 2.24 | 271% |
| or | 1556 | 0.43 | 5 | 2.24 | 123% |
| ti | 1231 | 0.34 | 3 | 2.24 | 134% |
| as | 1211 | 0.33 | 1 | 1 | 100% |
| te | 985 | 0.27 | 2 | 1 | 200% |
| et | 704 | 0.19 | 2 | 1 | 200% |
| ng | 668 | 0.18 | 2.24 | 1.41 | 159% |
| of | 569 | 0.16 | 5.10 | 2.24 | 228% |
| al | 341 | 0.09 | 8 | 2.83 | 283% |
| de | 332 | 0.09 | 1 | 1 | 100% |
| se | 300 | 0.08 | 1.41 | 2.24 | −37% |
| le | 298 | 0.08 | 6.08 | 1.41 | 204% |
| sa | 215 | 0.06 | 1 | 1 | 100% |
| si | 186 | 0.05 | 6.08 | 2.24 | 271% |
| ar | 157 | 0.04 | 3.16 | 2.24 | 141% |
| ve | 148 | 0.04 | 2.83 | 1 | 283% |
| ra | 137 | 0.04 | 3.16 | 2.24 | 141% |
| ld | 64 | 0.02 | 6 | 1 | 600% |
| ur | 60 | 0.02 | 3 | 2 | 150% |
| | | | | | 7519%/39 = 192.8% per digraph |

The following table illustrates finger distances for 26 most common English words using a conventional QWERTY keypad and the digraphic keypad 200.

| Word | QWERTY | Digraphic Keypad | +%/−% | Accumulation % |
|---|---|---|---|---|
| the | 4.57 | 2.41 | 190% | 190% |
| and | 10.20 | 3 | 340% | 530% |
| of | 5.10 | 2.24 | 228% | 758% |
| to | 4 | 2.24 | 179% | 937% |
| in | 2.24 | 1 | 224% | 1161% |
| is | 6.08 | 1.41 | 431% | 1592% |
| for | 10.10 | 4.48 | 225% | 1817% |
| that | 10.53 | 4 | 263% | 2080% |
| has | 6 | 3 | 200% | 2280% |
| be | 2.24 | 2 | 112% | 2392% |
| it | 3 | 2.24 | 134% | 2526% |
| by | 2 | 2 | 100% | 2626% |
| was | 2.41 | 3.24 | −26% | 2600% |
| as | 1 | 1 | 100% | 2700% |
| he | .16 | 1.41 | 224% | 2924% |
| with | 10.41 | 6.85 | 152% | 3076% |
| on | 2.83 | 1 | 283% | 3359% |
| his | 8.32 | 5.07 | 164% | 3523% |
| at | 4.12 | 1 | 412% | 3935% |
| which | 13.08 | 9.07 | 144% | 4079% |
| but | 4.24 | 3.83 | 111% | 4190% |
| from | 8.24 | 6.48 | 127% | 4317% |
| this | 9.73 | 6.07 | 160% | 4477% |
| will | 8.41 | 5.61 | 150% | 4627% |
| have | 11.95 | 5.24 | 228% | 4855% |
| are | 4.16 | 2.24 | 186% | 5041%/26 = 193.9% per common word |

The arrangement of keys of the digraphic keypads 100, 200, 300, 400, 500 and 600 is designed pedagogically and in accordance with principles of dynamic programming to achieve optimal ease of learning and ease of use within a movement radius of the 5 fingers of an operator. Thus, the digraphic keypads 100, 200, 300, 400, 500 and 600 can have fewer but bigger keys. As an example, for the digraphic keypad 200, a user can enter the 12 most frequent letters ("S", "O", "U", "A", "N", "I", "T", "E", "R", "H", "D" and "L"—77% of text input) with single taps, the 8 more frequent letters ("P", "C", "G", "W", "Y", "F", "M" and "K"—21% of text input) with single taps, and the remaining letters of six consonants ("J", "B", "Q", "V", "X" and "Z"—2% of text input) with triple taps. Since the letter patterns are based on their frequencies, 98% of the times the user only needs to use a single tap.

The proposed text input technology applies to any language regardless of its alphabet in accordance with an optimized user interface, making text entry on small electronic devices faster and more intuitive. As an example, the concepts described herein can be applied to Hangul, Korean alphabet.

Figure 7:
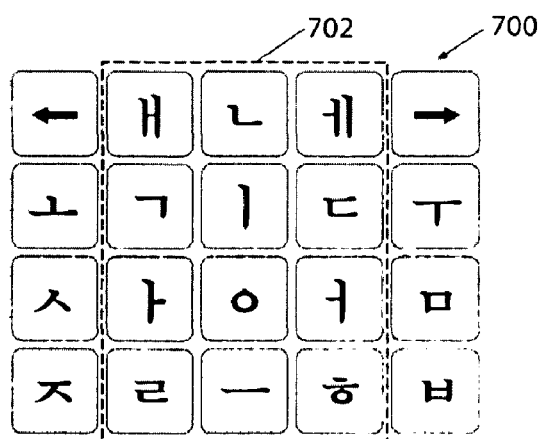
FIG. 7 is a diagram of a Korean language digraphic keypad with a core 3×4 key matrix and additional eight keys in accordance with an embodiment of the invention.

In FIG. 7, a digraphic keypad 700 for entering Korean alphabet in accordance with an embodiment of the invention is shown. The digraphic keypad includes a core 3×4 matrix 702 of keys. The core 3×4 key matrix 702 includes three columns and four rows. The first row (from the top) of the core 3×4 key matrix 702 includes a "ㅐ" key, a "ㄴ" key and a "ㅔ" key in order from left to right. The second row of the core 3×4 key matrix 702 includes a "ㅣ" key, a "ㅡ" key and a "ㄷ" key in order from left to right. The third row of the core 3×4 key matrix 702 includes a "ㅏ" key, a "ㅇ" key and a "ㅓ" key in order from left to right. The fourth row of the core 3×4 key matrix 702 includes a "ㄹ" key, a "ㅡ" key, and a "ㅎ" in order from left to right. The digraphic keypad 700 further includes an additional eight keys, a "←" key, a "ㅗ" key, a "ㅅ" key, a "ㅈ" key, a "→" key, a "ㄱ" key, a "ㅁ" key, and a "ㅂ" key. The "←", "ㅗ", "ㅅ" and "ㅈ" keys are located in a column next to the first column of the core 3×4 key matrix 702 such that the "←", "ㅗ", "ㅅ" and "ㅈ" keys are located on the same rows as the "ㅐ", "ㅣ", "ㅏ" and "ㄹ" keys, respectively, of the core 3×4 key matrix 702. The "→", "ㄱ", "ㅁ" and "ㅂ" keys are located in a column next to the third column of the core 3×4 key matrix 702 such that the "→", "ㄱ", "ㅁ" and "ㅂ" keys are located on the same rows as the "ㅔ", "ㄷ", "ㅓ" and "ㅎ" keys, respectively, of the core 3×4 key matrix 702.

The digraphic keypads described herein provide a faster, easier and more accurate means of entering text as compared to other keypads, e.g., a soft QWERTY keyboard, to any handwriting recognition system. In summary, these digraphic keypads are designed and optimized for general purpose of text entry on small devices. The digraphic keypads have fewer keys and utilize a clustered layout for entering most frequent 12 characters with a single tap, which is ideal when using a stylus or a single finger. Since some of the keys of the digraphic keyboards are multiple character input keys, fewer keys are needed for the entire alphabet than a QWERTY keypad, which means smaller area is needed to accommodate the digraphic keypads. Thus, some of the digraphic keypads are ideal for small electronic devices, such as cellular phones.

In some embodiments, the digraphic keypads may be configured to facilitate data entry chording (i.e., pressing several keys simultaneously) to produce words or commonly used grouping of letters. This feature allows a user to enter text in a more convenient and quick manner.

Some of the advantages of the digraphic keypads in accordance with the different embodiments of the invention include:
  a. specifically anticipate the needs of users of handheld computing devices;
  b. incorporate an intuitive shapes and an ingenious digraph tendency arrangement to expedite learning of new data entry techniques;
  c. reduced number of taps required to enter the most commonly used strings of characters;
  d. can be integrated easily with other closely related art.
  e. have ergonomic design that enhances effectiveness and reduces the finger/arm; and
  f. are easy to learn and simple to use due to the digraphic interactive arrangement.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:
1. A keypad comprising:
  a first row of keys including an "S" key, an "O" key and a "U" key;
  a second row of keys including an "A" key, an "N" key and an "I" key;
  a third row of keys including a "T" key, an "E" key and an "R" key; and
  a fourth row of keys including an "H" key, a "D" key and an "L" key.

2. The keypad of claim 1 wherein the "S" key, the "A" key, the "T" key and the "H" key are positioned in a first column of keys, the "O" key, an "N" key, the "E" key and the "D" key are positioned in a second column of keys, and the "U" key, the "I" key, the "R" key and the "L" key are positioned in a third column of keys.

3. The keypad of claim 2 wherein the "S" key, the "O" key, the "U" key are positioned adjacent to each other in the first row of keys such that the "O" key is positioned between the "S" key and the "U" key.

4. The keypad of claim 3 wherein the "S" key, the "O" key, the "U" key, the "A" key, the "I" key, the "T" key, the "R" key, the "H" key, the "D" key and the "L" key are multiple character input keys.

5. The keypad of claim 4 further comprising at least one text bar that is configured to switch some of the multiple character input keys between characters for input.

6. The keypad of claim 1 wherein the first row of keys includes a "P" key and a "Y" key; the second row of keys includes a "C" key and an "F" key; the third row of keys includes a "G" key and an "M" key; and the fourth row of keys includes a "W" key and a "K" key.

7. The keypad of claim 6 wherein the "S" key, the "O" key, the "U" key, the "H" key, the "D" key and the "L" key are multiple character input keys.

8. The keypad of claim 6 wherein the first row of keys includes a "B" key and a language conversion key; the second row of keys includes a V" key and a "J" key; the third row of keys includes an "X" key and a "Q" key; and the fourth row of keys includes a "Z" key and a space key.

9. The keypad of claim 6 further comprising:
  a fifth row of keys including a "J" key, a "B" key and a "Q" key; and
  a sixth row of keys including an "X" key, a "V" key and a "Z" key.

10. The keypad of claim 9 wherein the first, second, third, fourth, fifth and sixth rows of keys are arranged such that the first, second, third and fourth rows of keys are positioned between the fifth and sixth rows of keys.

11. A keypad comprising:
  a first column of keys including an "S" key, an "A" key, a "T" key and an "H" key;
  a second column of keys including an "O" key, an "N" key, an "E" key and a "D" key; and
  a third column of keys including a "U" key, an "I" key, an "R" key and an "L" key.

12. The keypad of claim 11 wherein the "S" key, the "O" key and the "U" key are positioned in a first row of keys; the "A" key, the "N" key and the "I" key are positioned in a second row of keys; the "T" key, the "E" key and the "R" key are positioned in a third row of keys; and the "H" key, the "D" key and the "L" key are positioned in a fourth row of keys.

13. The keypad of claim 12 wherein the "S" key, the "O" key, the "U" key are positioned adjacent to each other in the first row of keys such that the "O" key is positioned between the "S" key and the "U" key.

14. The keypad of claim 13 wherein the "S" key, the "O" key, the "U" key, the "A" key, the "I" key, the "T" key, the "R" key, the "H" key, the "D" key and the "L" key are multiple character input keys.

15. The keypad of claim 14 further comprising at least one text bar that is configured to switch some of the multiple character input keys between characters for input.

16. The keypad of claim 11 further comprising:
- a fourth column of keys including a "P" key, a "C" key, a "G" key and a "W" key; and
- a fifth column of keys including a "Y" key, an "F" key, an "M" key and a "K" key.

17. The keypad of claim 16 wherein the first, second, third, fourth and fifth columns of keys are arranged such that the first, the second and third columns of keys are positioned between the fourth and fifth column of keys.

18. The keypad of claim 16 wherein the "S" key, the "O" key, the "U" key, the "H" key, the "D" key and the "L" key are multiple character input keys.

19. The keypad of claim 16 further comprising:
- a sixth column of keys including a "B" key, a "V" key, an "X" key and a "Z" key; and
- a seventh column of keys including a language conversion key, a "J" key, a "Q" key and a space key.

20. The keypad of claim 16 wherein the first column of keys includes a "J" key and an "X" key; the second column of keys includes a "B" key and a "V" key; and the third column of keys includes a "Q" key and a "Z" key.

21. A keypad comprising:
- a core matrix of keys arranged in a configuration of four rows and three columns, the keys in the core matrix consisting of: an "S" key; an "O" key; "U" key; an "A" key; an "N" key; an "I" key; a "T" key; an "E" key; an "R" key; an "H" key; a "D" key; and an "L" key.

22. The keypad of claim 21 wherein the "S" key, the "O" key and the "U" key are positioned in a first row of keys; the "A" key, the "N" key and the "I" key are positioned in a second row of keys; the "T" key, the "E" key and the "R" key are positioned in a third row of keys; and the "H" key, the "D" key and the "L" key are positioned in a fourth row of keys.

23. The keypad of claim 22 wherein the "S" key, the "A" key, the "T" key and the "H" key are positioned in a first column of keys; the "O" key, the "N" key, the "E" key and the "D" key are positioned in a second column of keys; and the "U" key, the "I" key, the "R" key and the "L" key are positioned in a third column of keys.

24. The keypad of claim 23 wherein the "S" key, the "O" key, the "U" key are positioned adjacent to each other in the first row of keys such that the "O" key is positioned between the "S" key and the "U" key.

25. The keypad of claim 24 wherein the "S" key, the "O" key, the "U" key, the "A" key, the "I" key, the "T" key, the "R" key, the "H" key, the "D" key and the "L" key are multiple character input keys.

26. A keypad for entering Korean alphabet comprising:
- a core matrix of keys arranged in a configuration of four rows and three columns, the keys in the core matrix consisting of: a "ㅐ" key; a "ㄴ" key; a "ㅔ" key; a "ㄱ" key; a "ㅣ" key; a "ㄷ" key; a "ㅏ" key; a "ㅇ" key; a "ㅓ" key; a "ㄹ" key; a "ㅡ" key; and a "ㅎ" key.

* * * * *